United States Patent
Xia et al.

(10) Patent No.: US 12,038,753 B2
(45) Date of Patent: Jul. 16, 2024

(54) SPEED PLANNING METHOD AND APPARATUS, ELECTRONIC DEVICE AND STORAGE MEDIUM

(71) Applicant: SHANGHAI TAIMI ROBOTICS TECHNOLOGY CO., LTD., Shanghai (CN)

(72) Inventors: Zhituo Xia, Shanghai (CN); Zhifan Su, Shanghai (CN); Jing Pan, Shanghai (CN)

(73) Assignee: SHANGHAI TAIMI ROBOTICS TECHNOLOGY CO., LTD., Shanghai (CN)

( * ) Notice: Subject to any disclaimer, the term of this patent is extended or adjusted under 35 U.S.C. 154(b) by 264 days.

(21) Appl. No.: 17/426,482

(22) PCT Filed: Sep. 2, 2019

(86) PCT No.: PCT/CN2019/103916
§ 371 (c)(1),
(2) Date: Jul. 28, 2021

(87) PCT Pub. No.: WO2020/237890
PCT Pub. Date: Dec. 3, 2020

(65) Prior Publication Data
US 2022/0107647 A1     Apr. 7, 2022

(30) Foreign Application Priority Data
May 28, 2019   (CN) .................... 201910450884.3

(51) Int. Cl.
G05D 1/02    (2020.01)
G05D 1/00    (2006.01)

(52) U.S. Cl.
CPC ......... G05D 1/0214 (2013.01); G05D 1/0223 (2013.01)

(58) Field of Classification Search
CPC .. G05D 1/0214; G05D 1/0223; G05D 1/0274; G05D 1/0221; G05D 1/0236;
(Continued)

(56) References Cited

U.S. PATENT DOCUMENTS

| 6,636,148 B2 * | 10/2003 | Higuchi ............... G05D 1/0246 340/436 |
| 2010/0076640 A1 * | 3/2010 | Maekawa ........... G05D 1/0217 701/25 |

(Continued)

FOREIGN PATENT DOCUMENTS

| CN | 101149253 A | 3/2008 |
| CN | 102331744 A | 1/2012 |

(Continued)

OTHER PUBLICATIONS

Examiner Search for Chinese Patent Application No. 201910450884.3, mailed Apr. 5, 2020.
(Continued)

*Primary Examiner* — Jason Holloway
(74) *Attorney, Agent, or Firm* — Andrus Intellectual Property Law, LLP

(57) ABSTRACT

Provided are a speed planning method and apparatus, an electronic device, and a storage medium. The method includes determining a planned path on which a target object reaches a target position from a current position; in the planned path, performing cubic B-spline curve fitting on a path between the current position and a position with a set distance from the current position to obtain a fitted curve; calculating a radius of curvature of the fitted curve, and calculating a corresponding angular speed based on the radius of curvature and a preset forward speed; based on current obstacle information in a map where the target object is located, judging whether a risk of collision with an
(Continued)

obstacle during a process of the target object traveling along the fitted curve at the angular speed exists.

14 Claims, 3 Drawing Sheets

(58) Field of Classification Search
CPC .... G05D 1/024; G05D 1/0242; G05D 1/0257; G05D 1/0263; G05D 1/0276; G05D 1/028; G05D 2201/0212
See application file for complete search history.

(56) References Cited

U.S. PATENT DOCUMENTS

| | | | |
|---|---|---|---|
| 2017/0341645 | A1 | 11/2017 | Sugita et al. |
| 2020/0167934 | A1* | 5/2020 | Bacchus ................. G06T 7/246 |
| 2020/0209402 | A1* | 7/2020 | Abari ................. B60W 30/146 |

FOREIGN PATENT DOCUMENTS

| | | |
|---|---|---|
| CN | 104615084 A | 5/2015 |
| CN | 106020197 A | 10/2016 |
| CN | 106569496 A | 4/2017 |
| CN | 107678424 A | 2/2018 |
| CN | 107783533 A | 3/2018 |
| CN | 109343531 A | 2/2019 |
| CN | 109540159 A | 3/2019 |
| CN | 110187706 A | 8/2019 |
| JP | 2010073080 A | 4/2010 |
| JP | 2012226613 A | 11/2012 |

OTHER PUBLICATIONS

First Office Action for Chinese Patent Application No. 201910450884.3, mailed Apr. 13, 2020.
Supplemental Examiner Search for Chinese Patent Application No. 201910450884.3, mailed May 12, 2020.
Second Office Action for Chinese Patent Application No. 201910450884.3, mailed May 19, 2020.
International Search Report for PCT Patent Application No. PCT/CN2019/103916, mailed Feb. 27, 2020.
Office Action for Japanese Patent Application No. 2021-569583, dated Aug. 24, 2022.

* cited by examiner

SPEED PLANNING METHOD AND APPARATUS, ELECTRONIC DEVICE AND STORAGE MEDIUM

CROSS-REFERENCE TO RELATED APPLICATIONS

This is a National Stage Application filed under 35 U.S.C. 371 based on International Patent Application No. PCT/CN2019/103916, filed on Sep. 2, 2019, which claims priority to Chinese Patent Application No. 201910450884.3 filed on May 28, 2019, disclosures of both of which are incorporated herein by reference in their entireties.

TECHNICAL FIELD

Embodiments of the present application relate to the technical field of robot path and speed planning, for example, a speed planning method and apparatus, an electronic device, and a storage medium.

BACKGROUND

With the popularity of the robot, the robot is more and more widely used in various scenarios. In the actual work of a robot, to reach the designated destination safely and quickly, the robot needs to flexibly avoid obstacles in a traveling path.

At present, a speed planning method applied to the robot is described below. After a planned path of the robot is obtained, corresponding simulation paths when the robot travels at multiple possible forward speeds and rotation speeds are calculated respectively; the simulation paths are evaluated respectively, and a simulation path that does not collide with obstacles and best fits the planned path is determined as an optional simulation path; finally, the fastest forward speed and a rotation speed corresponding to the fastest forward speed are selected from forward speeds and rotation speeds corresponding to the optional simulation path as traveling speeds finally adopted by the robot.

It can be seen that the related robot speed planning method has a relatively large amount of calculation, which in turn leads to poor real-time performance of robot avoiding obstacles, and there is a certain safety risk.

SUMMARY

Embodiments of the present application provide a speed planning method and apparatus, an electronic device, and a storage medium.

In a first aspect, embodiments of the present application provide a speed planning method. The method includes step described below. A planned path on which a target object reaches a target position from a current position is determined. In the planned path, cubic B-spline curve fitting is performed on a path between the current position and a position with a set distance from the current position to obtain a fitted curve. A radius of curvature of the fitted curve is calculated, and a corresponding angular speed based on the radius of curvature and a preset forward speed is calculated. Based on current obstacle information in a map where the target object is located, whether a risk of collision with an obstacle exists during a process of the target object traveling along the fitted curve at the angular speed is judged; and based on a judgment result that no risk of collision with the obstacle exists during the process of the target object traveling along the fitted curve at the angular speed, the angular speed as a traveling speed of the target object is determined.

In a second aspect, embodiments of the present application provide a speed planning apparatus. The apparatus includes a determination module, a fitting module, a calculation module, and a judgment module. The determination module is configured to determine a planned path on which a target object reaches a target position from a current position. The fitting module is configured to: in the planned path, perform cubic B-spline curve fitting on a path between the current position and a position with a set distance from the current position to obtain a fitted curve. The calculation module is configured to calculate a radius of curvature of the fitted curve and calculate a corresponding angular speed based on the radius of curvature and a preset forward speed. The judgment module is configured to based on current obstacle information in a map where the target object is located, judge whether a risk of collision with an obstacle exists during a process of the target object traveling along the fitted curve at the angular speed; and based on a judgment result that no risk of collision with the obstacle exists during the process of the target object traveling along the fitted curve at the angular speed, determine the angular speed as a traveling speed of the target object.

In a third aspect, embodiments of the present application further provide an electronic device. The electronic device includes a memory, a processor, and a computer program stored in the memory and executable by the processor. When executing the computer program, the processor implements the speed planning method described in the first aspect.

In a fourth aspect, embodiments of the present application further provide a storage medium comprising computer-executable instructions that, when executed by a computer processor, implement the speed planning method described in the first aspect.

DETAILED DESCRIPTION

Figure 1:
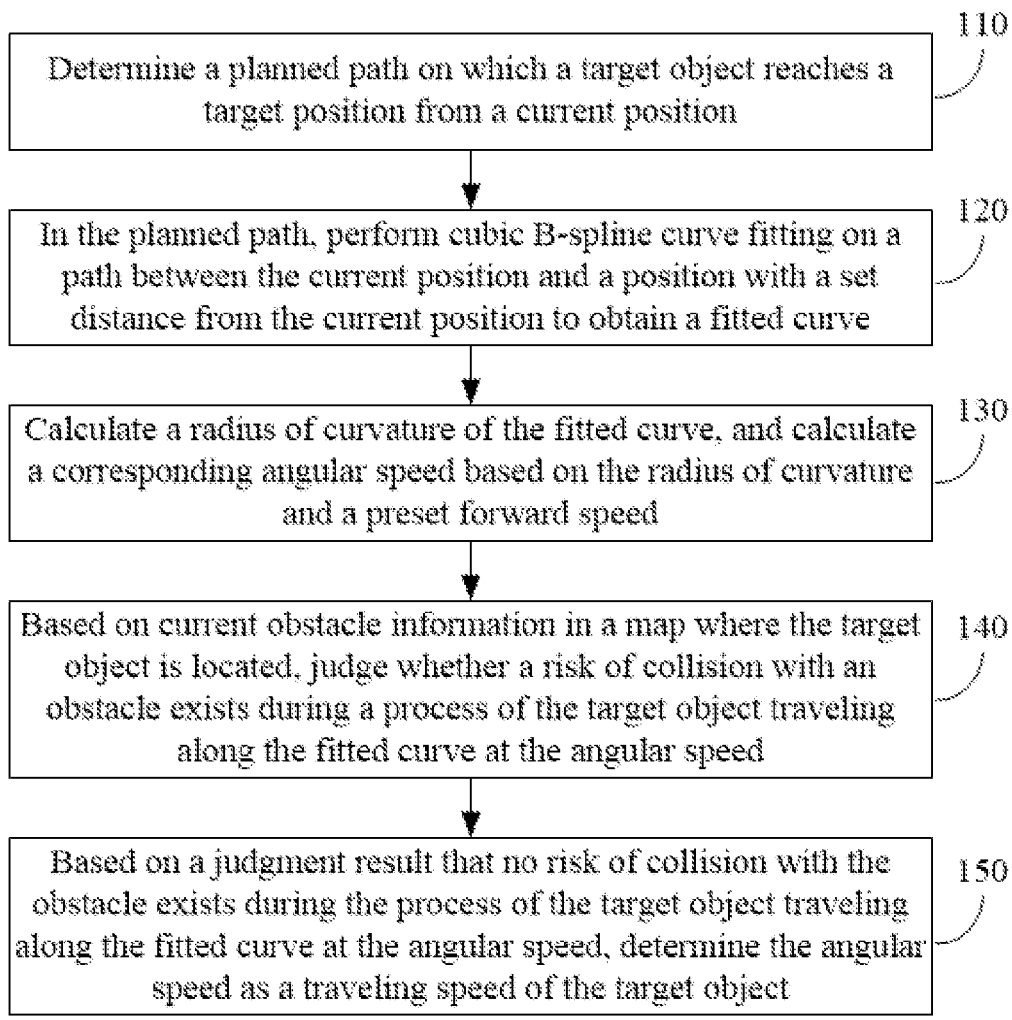
FIG. 1 is a flowchart of a speed planning method according to an embodiment of the present application.

FIG. 1 is a flowchart of a speed planning method according to an embodiment of the present application. The speed planning method disclosed in this embodiment may be executed by a speed planning apparatus, where the apparatus may be implemented by at least one of software or hardware and is generally integrated in a terminal such as a robot, an unmanned vehicle, or a server. As shown in FIG. 1, the method includes steps 110 to 150.

In step 110, a planned path on which a target object reaches a target position from a current position is determined.

The target object may refer to an unmanned intelligent device such as a robot and an unmanned vehicle. In this embodiment, the case where the target object is a robot is used as an example for description. The current position refers to a real-time position of the robot at the current moment, and the target position refers to a position where the robot is expected to reach.

In an embodiment, the planned path on which the robot reaches the target position from the current position is searched for by using the Dijkstra algorithm. The planned path is a set of two-dimensional coordinate points and is denoted as a set $A=\{A_0, A_1, A_2 \ldots A_{m-1}\}$, where $A_0$ denotes coordinates of the current position of the robot, and $A_0, A_1, A_2, \ldots, A_{m-1}$ are sequentially arranged from small to great according to distances from the current position of the robot. Search parameters of the Dijkstra algorithm are set so that it is ensured that in the case where the robot is at any coordinate point in the set A, the robot maintains a certain safe distance from an obstacle. In the case where a planned path that satisfies the preceding conditions cannot be searched for by using the Dijkstra algorithm, the robot is controlled to stop. After a period of time, searching is continued or the intervention of external means is requested to eliminate the interference of a dynamic obstacle, for example, the dynamic obstacle may be a passing pedestrian.

In step 120, cubic B-spline curve fitting is performed on a path between the current position and a position with a set distance from the current position in the planned path to obtain a fitted curve.

It is assumed that the set distance is two meters, a position two meters away from the current position $A_0$ is a coordinate point $A_2$, and cubic B-spline curve fitting is performed on a path between the coordinate point $A_0$ and the coordinate point $A_2$ in the planned path so that a fitted curve is obtained. The purpose of the cubic B-spline curve fitting is to use a fitted smooth curve to replace a fitted corresponding road section in the planned path. In this manner, unsmooth points and points where slopes change abruptly in the planned path obtained in step 110 can be avoided so that the smoothness of a traveling path of the robot can be improved, and thus the traveling stability of the robot can be ensured.

In step 130, a radius of curvature of the fitted curve is calculated, and a corresponding angular speed is calculated based on the radius of curvature and a preset forward speed.

Exemplarily, the step in which the radius of curvature of the fitted curve calculated includes steps described below. An initial point of the fitted curve and a slope extreme point of the fitted curve is determined respectively. Based on a slope of the fitted curve at the initial point, a slope of the fitted curve at the slope extreme point, and a distance between the initial point and the slope extreme point, the radius of curvature of the fitted curve is calculated. The angular speed is calculated according to the formula described below.

$$w = \frac{v}{R}.$$

w denotes the angular speed, R denotes the radius of curvature, and v denotes the preset forward speed.

The preset forward speed of the robot and the angular speed of the robot are strongly constrained by using the radius of curvature of the fitted curve. In this manner, a number of candidate forward speeds and angular speeds that need to be verified can be greatly reduced so that the amount of calculation can be reduced, and thus the real-time performance of the robot speed planning can be improved.

It is to be noted that the purpose of verifying candidate forward speeds and angular speeds is to determine whether a generated traveling path approximately coincides with the planned path and not to collide with the obstacle in the case where the robot travels at a current forward speed and a corresponding angular speed. Through the verification of multiple sets of candidate forward speeds and angular speeds, the fastest speed with the highest degree of coincidence between the generated traveling path and the planned path is selected as the planned speed finally adopted by the robot. In the technical solution of this embodiment, the preset forward speed and the angular speed of the robot are strongly constrained by using the radius of curvature of the fitted curve. Only the candidate forward speed and angular speed that satisfy the constraint conditions are verified, and the candidate forward speed and angular speed that does not satisfy the constraint conditions are not verified so that the amount of calculation can be greatly reduced. Moreover, the planned path is fitted into an approximate curve, and the angular speed corresponding to each forward speed is obtained based on the constraint relationship between the radius of curvature, the forward speed, and the angular speed. In this manner, whether the risk of collision with the obstacle exists during the process of the target object traveling along the fitted curve at the angular speed is judged just according to the angular speed, and the influence of the forward speed and the degree of coincidence with the planned path do not need to be considered so that the amount of calculation generated during speed planning is reduced by reducing the constraint conditions, and thus the real-time performance of the speed planning can be improved.

In step 140, based on current obstacle information in a map where the target object is located, whether a risk of collision with an obstacle exists during a process of the target object traveling along the fitted curve at the angular speed is judged.

The current obstacle information in the map where the target object is located may be detected and acquired in real time by a variety of sensors. For example, the robot acquires the position of the robot in an occupancy grid map according to lidar or color and depth RGBD sensors and determines the obstacle information around the robot according to a gray value of the surrounding grid.

In an embodiment, the step in which based on the current obstacle information in the map where the target object is located, whether the risk of collision with the obstacle exists during the target object traveling along the fitted curve at the angular speed is judged includes steps described below. A path through which the target object passes at the angular speed for a set time is determined. Based on the current obstacle information in the map where the target object is located, whether an obstacle exists in the path is judged. Based on a judgment result that no obstacle exists in the path, that no risk of collision with the obstacle exists during the process of the target object traveling along the fitted curve at the angular speed is determined.

It is to be understood that theoretically, no obstacle exists on the planned path and the path represented by the fitted curve. However, considering the delay of calculation and the complexity of the environment, it is necessary to make a judgment to focus on eliminating real-time interference caused by a dynamic obstacle so that the robot can be prevented from colliding with the dynamic obstacle.

In step 150, based on a judgment result that no risk of collision with the obstacle exists during the process of the target object traveling along the fitted curve at the angular speed, the angular speed is determined as a traveling speed of the target object.

In an embodiment, based on the judgment result that the risk of collision exists with the obstacle during the process of the target object traveling along the fitted curve at the angular speed, the preset forward speed is reduced, and the process may return to the steps 130 to 140. Based on the radius of curvature and the reduced forward speed, a corresponding angular speed is recalculated. Based on the current obstacle information in the map where the target object is located, whether a risk of collision with the obstacle exists during a process of the target object traveling along the fitted curve at the recalculated angular speed is judged. Based on a judgment result that the risk of collision with the obstacle exists during the process of the target object traveling along the fitted curve at the recalculated angular speed, the preset forward speed is reduced continuously until an angular speed without the risk of collision with the obstacle is obtained. It is to be noted that if the risk of collision with the obstacle exists, the preset forward speed may be reduced according to the actual situation.

An initial value of the preset forward speed is usually the maximum allowable forward speed. In the case where an angular speed obtained based on the maximum forward speed makes the risk of collision with the obstacle during the traveling process of the robot, the maximum forward speed is reduced by following a certain step until an angular speed without the risk of collision with the obstacle is obtained. In this manner, a suitable angular speed can be quickly planned, and thus the real-time performance of the speed planning can be improved.

It is to be understood that in the robot speed planning, the current position of the robot needs to be periodically updated according to the movement of the robot, and the speed of the robot is planned in real time by repeatedly using the speed planning method provided in this embodiment.

In the speed planning method provided in this embodiment, the cubic B-spline curve fitting is performed on one section of path, which is closest to the robot, in the planned path, and the section of path is replaced with the obtained fitted curve. In this manner, the purpose of avoiding the unsmooth points and the points where slopes change abruptly in the planned path is achieved so that the smoothness of the path through which the robot passes can be improved, and thus the traveling stability of the robot can be ensured. Meanwhile, the forward speed and the angular speed of the robot are strongly constrained by using the radius of curvature of the fitted curve. In this manner, the number of candidate forward speeds and angular speeds that need to be verified can be greatly reduced so that the amount of calculation can be reduced, and thus the real-time performance of the robot speed planning can be improved. Moreover, the planned path is fitted into an approximate curve, whether the risk of collision with the obstacle exists during the process of the robot traveling along the fitted curve at the angular speed is judged just according to the angular speed, and the influence of the forward speed and the degree of coincidence with the planned path do not need to be considered so that the amount of calculation generated during speed planning is reduced by reducing the constraint conditions, the real-time performance of the speed planning can be improved, and thus the safety during the traveling of the target object can be ensured.

Figure 2:
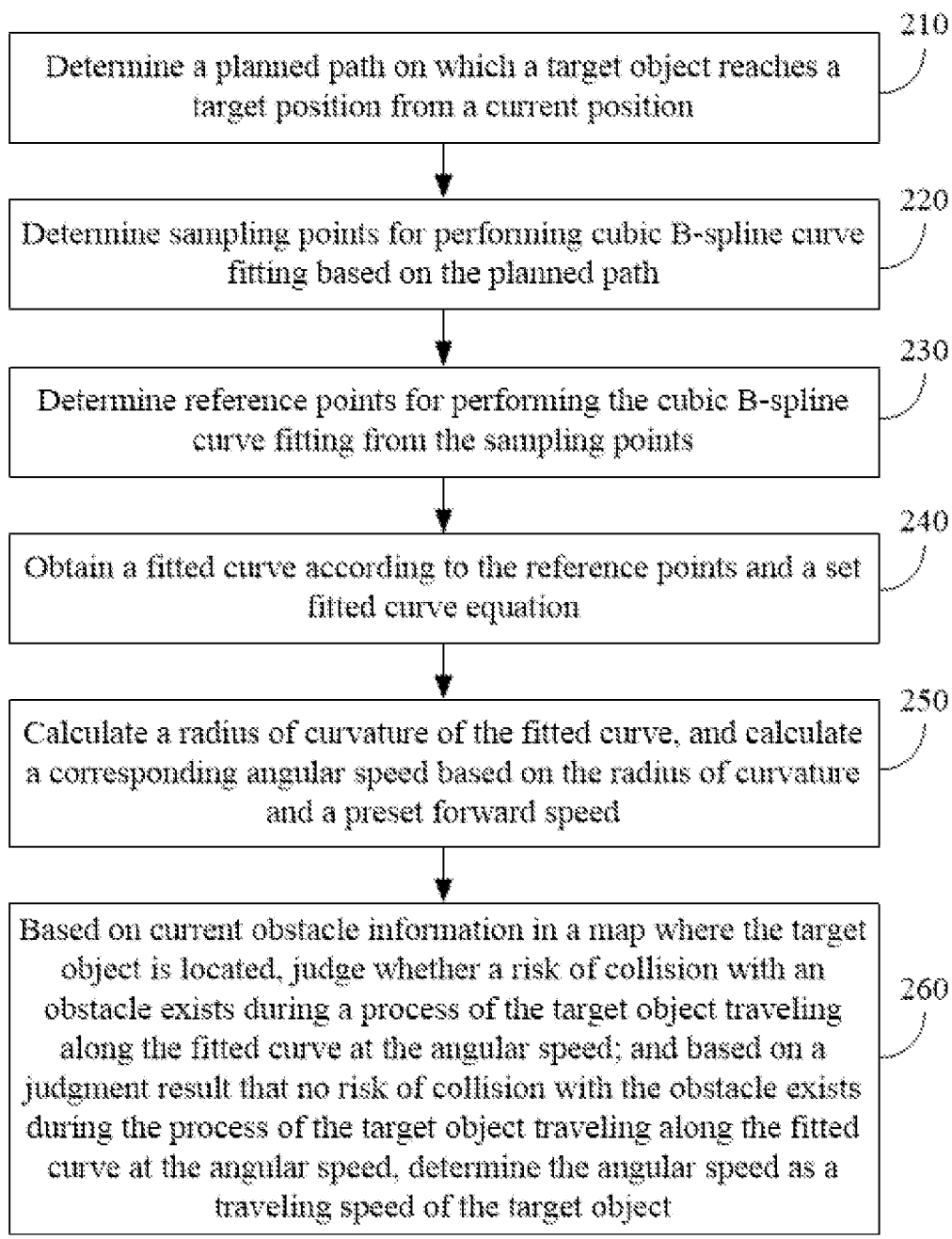
FIG. 2 is a flowchart of a speed planning method according to an embodiment of the present application.

FIG. 2 is a flowchart of a speed planning method according to an embodiment of the present application. Based on the preceding embodiment, this embodiment provides a detailed implementation process of the preceding step 120 and step 130. As shown in FIG. 2, the method includes steps 210 to 260.

In step 210, a planned path on which a target object reaches a target position from a current position is determined.

In step 220, sampling points for performing cubic B-spline curve fitting are determined based on the planned path.

In step 230, reference points for performing the cubic B-spline curve fitting are determined from the sampling points.

In step 240, a fitted curve is obtained according to the reference points and a set fitted curve equation.

In step 250, a radius of curvature of the fitted curve is calculated, and a corresponding angular speed is calculated based on the radius of curvature and a preset forward speed.

The planned path is a set of two-dimensional coordinate points and is denoted as a set $A=\{A_0, A_1, A_2 \ldots A_{m-1}\}$, where $A_0$ denotes coordinates of the current position of the robot, and $A_0, A_1, A_2, \ldots, A_{m-1}$ are sequentially arranged from small to great according to distances from the current position of the robot, which facilitates the determination of the sampling points for performing the cubic B-spline curve fitting. For example, coordinate points in the planned path are traversed, the coordinate points whose distances from the current position are less than the set distance are determined as the sampling points, and the determined sampling points are expressed as a sampling point set $B=\{B_0, B_1, B_2 \ldots B_{n-1}\}$, where the reference points for performing the cubic B-spline curve fitting are determined from the sampling points as follows:

$$C_0 = B_0,$$
$$C_1 = B_{floor(\frac{n-1}{3})},$$
$$C_2 = B_{ceil(\frac{n-1}{3}*2)}, \text{ and}$$
$$C_3 = B_{n-1}.$$

In this embodiment, the case where the number of the reference points is set to 4 is used as an example for description. It to be understood that the more the number of the reference points are, the higher the similarity between the fitted curve and the fitted path is. $C_0$, $C_1$, $C_2$, and $C_3$ denote the reference points, floor denotes rounding up, ceil denotes rounding down, the coordinates of reference point $C_0$ are expressed as $(x_0, y_0)$, the coordinates of $C_1$ are expressed as $(x_1, y_1)$, the coordinates of $C_2$ are expressed as $(x_2, y_2)$, and the coordinates of $C_3$ are expressed as $(x_3, y_3)$; the set fitted curve equation is described below.

$$f(x) = \frac{1}{6}\Big(\frac{y_0}{x_0}(1-x)^3 + \frac{y_1}{x_1}(3x^3 - 6x^2 + 4) + \frac{y_2}{x_2}(-3x^3 + 3x^2 + 3x + 1) + \frac{y_3}{x_3}x^3\Big).$$

According to the calculation process of the preceding fitted curve, it can be known that the reference point $C_0$ is the initial point of the fitted curve. The step in which the slope extreme point of the fitted curve is determined includes steps described below. A first derivative and a second derivative of the set fitted curve equation $f(x)$ is calculated, corresponding coordinate points in the case where the first derivative is zero and the second derivative is zero are calculated, a coordinate point closest to the reference point $C_0$ is selected from the calculated coordinate points, and the coordinate point closest to the reference point $C_0$ is marked as a slope extreme point D.

In an embodiment, the step in which based on the slope of the fitted curve at the initial point, the slope of the fitted curve at the slope extreme point, and the distance between the initial point and the slope extreme point, the radius of curvature of the fitted curve is calculated includes steps described below. A slope of the first derivative of the set fitted curve equation f(x) at the reference point $C_0$ is calculated, and the slope is marked as $k_0$. A slope of the first derivative of the set fitted curve equation f(x) at the slope extreme point D is calculated, and the slope is marked as kr. A distance between the reference point $C_0$ and the slope extreme point D is calculated, and the distance is marked as l, where the radius R of curvature of the fitted curve is described as follows:

$$R = \frac{l}{2 * \sin\left(\frac{k_1 - k_0}{2}\right)}.$$

In an embodiment, the angular speed corresponding to the preset forward speed is calculated according to the formula described below.

$$w = \frac{v}{R}.$$

w denotes the angular speed, R denotes the radius of curvature, and v denotes the preset forward speed.

In step 260, based on current obstacle information in a map where the target object is located, whether a risk of collision with an obstacle exists during a process of the target object traveling along the fitted curve at the angular speed is judged; and based on a judgment result that no risk of collision with the obstacle exists during the process of the target object traveling along the fitted curve at the angular speed, the angular speed is determined as a traveling speed of the target object.

In the speed planning method provided in this embodiment, the forward speed and the angular speed of the robot are strongly constrained by using the radius of curvature of the fitted curve. In this manner, the number of candidate forward speeds and angular speeds that need to be verified can be greatly reduced so that the amount of calculation can be reduced, and thus the real-time performance of the robot speed planning can be improved. Moreover, the planned path is fitted into an approximate curve, whether the risk of collision with the obstacle exists during the process of the robot traveling along the fitted curve at the angular speed is judged just according to the angular speed, and the influence of the forward speed and the degree of coincidence with the planned path do not need to be considered so that the amount of calculation generated during speed planning is reduced by reducing the constraint conditions, and thus the real-time performance of the speed planning can be improved.

Figure 3:
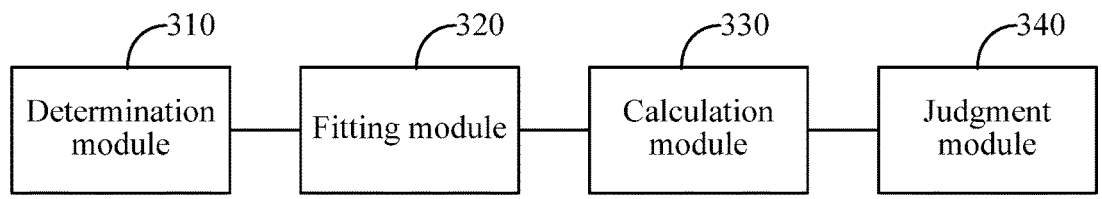
FIG. 3 is a structure diagram of a speed planning apparatus according to an embodiment of the present application.

FIG. 3 is a structure diagram of a speed planning apparatus according to an embodiment of the present application. As shown in FIG. 3, the apparatus includes a determination module 310, a fitting module 320, a calculation module 330, and a judgment module 340.

The determination module 310 is configured to determine a planned path on which a target object reaches a target position from a current position. The fitting module 320 is configured to: in the planned path, perform cubic B-spline curve fitting on a path between the current position and a position with a set distance from the current position to obtain a fitted curve. The calculation module 330 is configured to calculate a radius of curvature of the fitted curve and calculate a corresponding angular speed based on the radius of curvature and a preset forward speed. The judgment module 340 is configured to, based on current obstacle information in a map where the target object is located, judge whether a risk of collision with an obstacle exists during a process of the target object traveling along the fitted curve at the angular speed; and based on a judgment result that no risk of collision with the obstacle exists during the process of the target object traveling along the fitted curve at the angular speed, determine the angular speed as a traveling speed of the target object.

In an embodiment, the device further includes a forward speed adjustment module. The forward speed adjustment module is configured to reduce the preset forward speed based on a judgment result that the risk of collision with the obstacle exists during the process of the target object traveling along the fitted curve at the angular speed. Correspondingly, the calculation module 330 is configured to recalculate a corresponding angular speed based on the radius of curvature and the reduced forward speed; the judgment module 340 is configured to, based on the current obstacle information in the map where the target object is located, judge whether a risk of collision with the obstacle exists during a process of the target object traveling along the fitted curve at the recalculated angular speed; and based on a judgment result that no risk of collision with the obstacle exists during the process of the target object traveling along the fitted curve at the recalculated angular speed, determine the recalculated angular speed as a traveling speed of the target object. Based on a judgment result that the risk of collision with the obstacle exists during the process of the target object traveling along the fitted curve at the recalculated angular speed, the preset forward speed is reduced continuously until an angular speed without the risk of collision with the obstacle is obtained.

In an embodiment, the determination module 310 is configured to search for the planned path on which the target object reaches the target position from the current position by using the Dijkstra algorithm.

In an embodiment, the calculation module 330 includes a determination unit and a calculation unit.

The determination unit is configured to determine an initial point of the fitted curve and a slope extreme point of the fitted curve respectively.

The calculation unit is configured to, based on a slope of the fitted curve at the initial point, a slope of the fitted curve at the slope extreme point, and a distance between the initial point and the slope extreme point, calculate the radius of curvature of the fitted curve.

In an embodiment, the fitting module 320 includes a sampling point determination unit, a reference point determination unit, and a fitting unit.

The sampling point determination unit is configured to determine sampling points for performing the cubic B-spline curve fitting based on the planned path.

The reference point determination unit is configured to determine reference points for performing the cubic B-spline curve fitting from the sampling points.

The fitting unit is configured to obtain the fitted curve according to the reference points and a set fitted curve equation.

In an embodiment, the sampling point determination unit is configured to traverse coordinate points in the planned path and determine coordinate points whose distances from the current position are less than the set distance as the sampling points, where the coordinate points in the planned path are arranged from near to far according to the distances from the current position.

The reference point determination unit is configured to determine the reference points for performing the cubic B-spline curve fitting from the sampling points as follows:

$$C_0 = B_0,$$
$$C_1 = B_{floor(\frac{n-1}{3})},$$
$$C_2 = B_{ceil(\frac{n-1}{3}*2)}, \text{ and}$$
$$C_3 = B_{n-1}.$$

The sampling points are expressed as a sampling point set $B=\{B_0, B_1, B_2, \ldots, B_{n-1}\}$, $C_0$, $C_1$, $C_2$, and $C_3$ denote the reference points, floor denotes rounding up, ceil denotes rounding down, $(x_0, y_0)$ denotes the coordinate of reference point $C_0$, $(x_1, y_1)$ denotes the coordinate of reference point $C_1$, $(x_2, y_2)$ denotes the coordinate of reference point $C_2$, $(x_3, y_3)$ denotes the coordinate of reference point $C_3$.

The set fitted curve equation is described below.

$$f(x) = \frac{1}{6}\left(\frac{y_0}{x_0}(1-x)^3 + \frac{y_1}{x_1}(3x^3 - 6x^2 + 4) + \frac{y_2}{x_2}(-3x^3 + 3x^2 + 3x + 1) + \frac{y_3}{x_3}x^3\right).$$

In an embodiment, the determination unit is configured to select a coordinate point closest to the reference point $C_0$ from coordinate points with a first derivative of the set fitted curve equation f(x) being zero and a second derivative of the set fitted curve equation f(x) being zero and mark the coordinate point as a slope extreme point D.

The calculation unit is configured to: calculate a slope of the first derivative of the set fitted curve equation f(x) at the reference point $C_0$ and mark the slope as $k_0$; calculate a slope of the first derivative of the set fitted curve equation f(x) at the slope extreme point D, and mark the slope as $k_1$; and calculate a distance between the reference point $C_0$ and the slope extreme point D, and mark the distance as l.

The radius R of curvature of the fitted curve is calculated according to the formula described below.

$$R = \frac{l}{2*\sin\left(\frac{k_1-k_0}{2}\right)}.$$

In an embodiment, the judgment module 340 includes a determination unit and a judgment unit.

The determination unit is configured to determine a path through which the target object passes at the angular speed for a set time.

The judgment unit is configured to, based on the current obstacle information in the map where the target object is located, judge whether an obstacle exists in the path; and based on a judgment result that no obstacle exists in the path, determine that no risk of collision with the obstacle exists during the process of the target object traveling along the fitted curve at the angular speed.

In the speed planning apparatus provided in this embodiment, the forward speed and the angular speed of the robot are strongly constrained by using the radius of curvature of the fitted curve. In this manner, the number of candidate forward speeds and angular speeds that need to be verified can be greatly reduced so that the amount of calculation can be reduced, and thus the real-time performance of the robot speed planning can be improved. Moreover, the planned path is fitted into an approximate curve, whether the risk of collision with the obstacle exists during the process of the robot traveling along the fitted curve at the angular speed is judged just according to the angular speed, and the influence of the forward speed and the degree of coincidence with the planned path do not need to be considered so that the amount of calculation generated during speed planning is reduced by reducing the constraint conditions, and thus the real-time performance of the speed planning can be improved.

The speed planning apparatus provided in embodiments of the present application may execute the speed planning method provided in any embodiment of the present application. For technical details not described in detail in the preceding embodiments, see the speed planning method provided in any embodiment of the present application.

Figure 4:
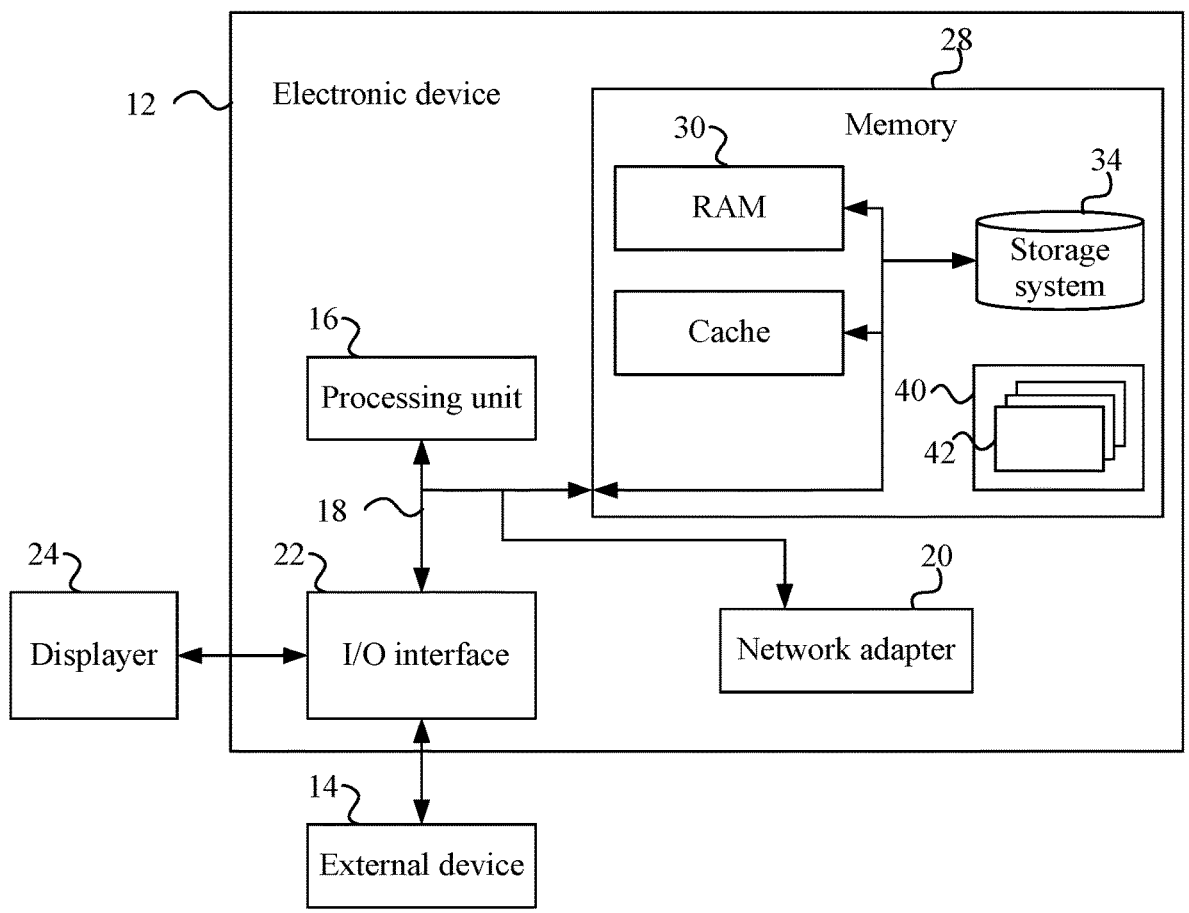
FIG. 4 is a structure diagram of an electronic device according to an embodiment of the present application.

FIG. 4 is a structure diagram of an electronic device according to an embodiment of the present application. Exemplarily, FIG. 4 shows a block diagram of an electronic device 12 for implementing embodiments of the present application. The electronic device 12 shown in FIG. 4 is merely an example and is not intended to limit the function and use scope of embodiments of the present application.

As shown in FIG. 4, the electronic device 12 may take a form of a general-purpose computer device. Components of the electronic device 12 may include, and is not limited to, one or more processors or processing units 16, a system memory 28, and a bus 18 connecting different system components (including the system memory 28 and the one or more processing units 16).

The bus 18 represents at least one of several types of bus architectures, including a memory bus or memory controller, a peripheral bus, an accelerated graphics port, and a processor or local bus using any of a variety of bus architectures. For example, these architectures include, and are not limited to, an industry standard architecture (ISA) bus, a micro channel architecture (MAC) bus, an enhanced ISA bus, a video electronics standards association (VESA) local bus, and a peripheral component interconnection (PCI) bus.

The electronic device 12 typically includes multiple computer system readable media. These media may be available media that can be accessed by the electronic device 12. These media include volatile and non-volatile media, and removable and non-removable media.

The system memory 28 may include computer system readable media in the form of volatile memory such as random access memory (RAM) 30 and/or a cache 32. The electronic device 12 may include other removable/non-removable, volatile/non-volatile computer system storage media. By way of example only, a storage system 34 may be configured to read from and write to non-removable, non-volatile magnetic media (not shown in FIG. 4, commonly referred to as a "hard disk drive"). Although not shown in FIG. 4, a magnetic disk drive for reading from or writing to removable, non-volatile magnetic disk (such as a "floppy disk"), and an optical disk drive for reading from or writing to a removable, non-volatile optical disk (such as a compact disc read-only memory (CD-ROM), a digital video disc-read only memory (DVD-ROM), or other optical media) may be provided. In these cases, each driver may be connected to the bus 18 via one or more data media interfaces. The memory 28 may include at least one program product. The program product has a set of program modules (for example, the determination module 310, the fitting module 320, the calculation module 330, and the judgment module 340 of the speed planning apparatus), and these program modules are configured to execute the function of embodiments of the present application.

A program/utility 40 having a set of program modules 42 (for example, the determination module 310, the fitting module 320, the calculation module 330, and the judgment module 340 of the speed planning apparatus) may be stored in the memory 28. Such program modules 42 include, and are not limited to, an operating system, at least one application program, other program modules and program data. Each or some combination of these examples may include implementation of a network environment. The program modules 42 generally perform functions and/or methods in embodiments of the present application.

The electronic device 12 may also communicate with at least one external device 14 (for example, a keyboard, a pointing terminal, a displayer 24, etc.). The electronic device 12 may also communicate with at least one device that enables a user to interact with the electronic device 12 and/or communicate with any device (for example, a network card, a modem, etc.) that enables the electronic device 12 to communicate with at least one of other computing devices. Such communication may be performed through an input/output (I/O) interface 22. Moreover, the electronic device 12 may communicate with at least one network (for example, a local area network (LAN), a wide area network (WAN), and/or a public network such as the Internet) through a network adapter 20. As shown in the figure, the network adapter 20 communicates with other modules of the electronic device 12 via the bus 18. It is to be understood that although not shown in the figure, other hardware and/or software modules may be used in conjunction with the electronic device 12. The other hardware and/or software modules include, and are not limited to, microcode, a device driver, a redundant processor, an external disk drive array, a redundant arrays of independent disks (RAID) system, a tape driver, a data backup storage system and the like.

The one or more processing units 16 execute a program stored in the system memory 28 to perform various functional applications and data processing, for example, to perform a speed planning method provided in embodiments of the present application. The method includes the steps described below.

A planned path on which a target object reaches a target position from a current position is determined.

In the planned path, Cubic B-spline curve fitting is performed on a path between the current position and a position with a set distance from the current position to obtain a fitted curve.

A radius of curvature of the fitted curve is calculated, and a corresponding angular speed is calculated based on the radius of curvature and a preset forward speed.

Based on current obstacle information in a map where the target object is located, whether a risk of collision with an obstacle exists during a process of the target object traveling along the fitted curve at the angular speed is judged.

Based on a judgment result that no risk of collision with the obstacle exists during the process of the target object traveling along the fitted curve at the angular speed, the angular speed is determined as a traveling speed of the target object.

The one or more processing units 16 execute a program stored in the system memory 28 to perform various functional applications and data processing, for example, to perform a speed planning method provided in embodiments of the present application.

Of course, it is to be understood by those skilled in the art that the processor can also implement technical solutions of the speed planning method provided in any embodiment of the present application.

An embodiment of the present application further provides a computer-readable storage medium configured to store computer programs for performing the speed planning method provided in embodiments of the present application when executed by a processor. The method includes the steps described below.

A planned path on which a target object reaches a target position from a current position is determined.

In the planned path, Cubic B-spline curve fitting is performed on a path between the current position and a position with a set distance from the current position to obtain a fitted curve.

A radius of curvature of the fitted curve is calculated, and a corresponding angular speed is calculated based on the radius of curvature and a preset forward speed.

Based on current obstacle information in a map where the target object is located, whether a risk of collision with an obstacle exists during a process of the target object traveling along the fitted curve at the angular speed is judged.

Based on a judgment result that no risk of collision with the obstacle exists during the process of the target object traveling along the fitted curve at the angular speed, the angular speed is determined as a traveling speed of the target object.

In the computer-readable storage medium provided in embodiments of the present application, the computer programs stored thereon implement not only the preceding method operations but also related operations in the speed planning method provided in any embodiment of the present application.

The computer storage medium in embodiments of the present application may employ any combination of at least one computer-readable medium. The at least one computer-readable media may be a computer-readable signal media or computer-readable storage media. The computer-readable storage medium may be, and not be limited to, an electrical, magnetic, optical, electromagnetic, infrared, or semiconductor system, apparatus, or device, or any combination thereof. More specific examples of the computer-readable storage medium include (non-exhaustive list): an electrical connection having one or more wires, a portable computer magnetic disk, a hard disk, a random-access memory (RAM), a read-only memory (ROM), an erasable programmable read-only memory (EPROM) or flash memory, an optical fiber, a portable compact disc read-only memory (CD-ROM), an optical memory device, a magnetic memory device, or any suitable combination thereof. In this document, the computer-readable storage medium may be any tangible medium including or storing a program. The program may be used by or used in conjunction with an instruction execution system, apparatus, or device.

The computer-readable signal medium may include a data signal propagated in a baseband or as part of a carrier. The data signal carries computer-readable program codes. The data signal propagated in this manner may be in multiple forms and includes, and is not limited to, an electromagnetic signal, an optical signal, or any suitable combination thereof. The computer-readable signal medium may further be any computer-readable medium other than a computer-readable storage medium. The computer-readable medium may send, propagate, or transmit the program used by or used in conjunction with the instruction execution system, apparatus, or device.

The program codes included on the computer-readable medium may be transmitted on any suitable medium including, and not limited to, a wireless medium, a wired medium, an optical cable, radio frequency (RF), and the like, or any suitable combination thereof.

Computer program codes for performing the operations of the present application may be written in one or more programming languages or a combination thereof, the programming languages including object-oriented programming languages such as Java, Smalltalk, C++ and further including conventional procedural programming languages such as C programming language or similar programming languages. The program codes may be executed entirely on a user computer, partly on the user computer, as a stand-alone software package, partly on the user computer and partly on a remote computer, or entirely on the remote computer or a server. In the case relating to the remote computer, the remote computer may be connected to the user computer via any kind of network including a local area network (LAN) or a wide area network (WAN), or may be connected to an external computer (for example, via the Internet through an Internet service provider).

What is claimed is:

1. A speed planning method, comprising:
    determining a planned path on which a target object reaches a target position from a current position;
    in the planned path, performing cubic B-spline curve fitting on a path between the current position and a position with a set distance from the current position to obtain a fitted curve;
    calculating a radius of curvature of the fitted curve, and calculating a corresponding angular speed based on the radius of curvature and a preset forward speed;
    based on current obstacle information in a map where the target object is located, judging whether a risk of collision with an obstacle exists during a process of the target object traveling along the fitted curve at the angular speed; and
    based on a judgment result that no risk of collision with the obstacle exists during the process of the target object traveling along the fitted curve at the angular speed, determining the angular speed as a traveling speed of the target object;
    wherein calculating the radius of curvature of the fitted curve comprises:
        determining an initial point of the fitted curve and a slope extreme point of the fitted curve respectively; and
        based on a slope of the fitted curve at the initial point, a slope of the fitted curve at the slope extreme point, and a distance between the initial point and the slope extreme point, calculating the radius of curvature of the fitted curve;
    wherein performing the cubic B-spline curve fitting on the path between the current position and the position with the set distance from the current position in the planned path to obtain the fitted curve comprises:
        determining sampling points for performing the cubic B-spline curve fitting based on the planned path;
        determining reference points for performing the cubic B-spline curve fitting from the sampling points; and
        obtaining the fitted curve according to the reference points and a set fitted curve equation; and
    wherein determining the sampling points for performing the cubic B-spline curve fitting based on the planned path comprises:
        traversing coordinate points in the planned path, and determining coordinate points whose distance from the current position is smaller than the set distance to be the sampling points, wherein the coordinate points in the planned path are arranged from small to large according to the distance from the current position.

2. The method of claim 1, further comprising:
    based on the judgment result that the risk of collision with the obstacle exists during the process of the target object traveling along the fitted curve at the angular speed, reducing the preset forward speed, and recalculating a corresponding angular speed based on the radius of curvature and the reduced forward speed;
    based on the current obstacle information in the map where the target object is located, judging whether a risk of collision with the obstacle exists during a process of the target object traveling along the fitted curve at the recalculated angular speed; and
    based on a judgment result that the risk of collision with the obstacle exists during the process of the target object traveling along the fitted curve at the recalculated angular speed, continuously reducing the preset forward speed until an angular speed without the risk of collision with the obstacle is obtained.

3. The method of claim 1, wherein determining the initial point and the slope extreme point of the fitted curve respectively comprises:
    selecting a coordinate point closest to the reference point $C_0$ from coordinate points with a first derivative being zero and a second derivative of the set fitted curve equation f(x) being zero, and marking the coordinate point as a slope extreme point D, wherein the reference point $C_0$ is the initial point of the fitted curve.

4. The method of claim 1, wherein based on the current obstacle information in the map where the target object is located, judging whether the risk of collision with the obstacle exists during the process of the target object traveling along the fitted curve at the angular speed comprises:
    determining a path through which the target object passes at the angular speed for a set time;
    based on the current obstacle information in the map where the target object is located, judging whether an obstacle exists in the path; and
    based on a judgment result that no obstacle exists in the path, determining that no risk of collision with the obstacle exists during the process of the target object traveling along the fitted curve at the angular speed.

5. An electronic device, comprising a memory, a processor and a computer program stored in the memory and executable by the processor, wherein when executing the computer program, the processor implements the speed planning method of claim 1.

6. A non-transitory storage medium comprising computer-executable instructions that, when executed by a computer processor, implement the speed planning method of claim 1.

7. The method of claim 2, wherein calculating the radius of curvature of the fitted curve comprises:
    determining an initial point of the fitted curve and a slope extreme point of the fitted curve respectively; and based on a slope of the fitted curve at the initial point, a slope of the fitted curve at the slope extreme point, and a distance between the initial point and the slope extreme point, calculating the radius of curvature of the fitted curve.

8. The method of claim 2, wherein based on the current obstacle information in the map where the target object is located, judging whether the risk of collision with the obstacle exists during the process of the target object traveling along the fitted curve at the angular speed comprises:
   determining a path through which the target object passes at the angular speed for a set time;
   based on the current obstacle information in the map where the target object is located, judging whether an obstacle exists in the path; and
   based on a judgment result that no obstacle exists in the path, determining that no risk of collision with the obstacle exists during the process of the target object traveling along the fitted curve at the angular speed.

9. An electronic device, comprising a memory, a processor and a computer program stored in the memory and executable by the processor, wherein when executing the computer program, the processor implements the speed planning method of claim 2.

10. An electronic device, comprising a memory, a processor and a computer program stored in the memory and executable by the processor, wherein when executing the computer program, the processor implements the speed planning method of claim 3.

11. An electronic device, comprising a memory, a processor and a computer program stored in the memory and executable by the processor, wherein when executing the computer program, the processor implements the speed planning method of claim 4.

12. A non-transitory storage medium comprising computer-executable instructions that, when executed by a computer processor, implement the speed planning method of claim 2.

13. The method of claim 1, wherein the reference points for performing the cubic B-spline curve fitting are determined from the sampling points as follows:

$$C_0 = B_0,$$

$$C_1 = B_{floor(\frac{n-1}{3})},$$

$$C_2 = B_{ceil(\frac{n-1}{3}*2)}, \text{ and}$$

$$C_3 = B_{n-1},$$

wherein, the sampling points are expressed as a sampling point set $B=\{B_0, B_1, B_2 \ldots B_{n-1}\}$, $C_0, C_1, C_2$, and $C_3$ denote reference points, floor denotes rounding up, and ceil denotes rounding down;
and the set fitted curve equation is as follows:

$$f(x) = \frac{1}{6}\left(\frac{y_0}{x_0}(1-x)^3 + \frac{y_1}{x_1}(3x^3 - 6x^2 + 4) + \frac{y_2}{x_2}(-3x^3 + 3x^2 + 3x + 1) + \frac{y_3}{x_3}x^3\right),$$

and
wherein, $(x_0, y_0)$ are coordinates of the reference point $C_0$, $(x_1, y_1)$ are coordinates of the reference point $C_1$, $(x_2, y_2)$ are coordinates of the reference point $C_2$, and $(x_3, y_3)$ are coordinates of the reference point $C_3$.

14. The method of claim 3, wherein based on the slope of the fitted curve at the initial point, the slope of the fitted curve at the slope extreme point, and the distance between the initial point and the slope extreme point, calculating the radius of curvature of the fitted curve comprises:
   calculating a slope of the first derivative of the set fitted curve equation f(x) at the reference point $C_0$, and marking the slope of the first derivative of the set fitted curve equation f(x) at the reference point $C_0$ as $k_0$;
   calculating a slope of the first derivative of the set fitted curve equation f(x) at the slope extreme point D, and marking the slope of the first derivative of the set fitted curve equation f(x) at the slope extreme point D as $k_l$;
   calculating a distance between the reference point $C_0$ and the slope extreme point D, and marking the distance between the reference point $C_0$ and the slope extreme point D as l; and
   calculating a radius R of curvature of the fitted curve according to a formula as follows:

$$R = \frac{l}{2*\sin\left(\frac{k_l - k_0}{2}\right)}.$$

* * * * *